US011969934B2

(12) United States Patent
Vaes et al.

(10) Patent No.: US 11,969,934 B2
(45) Date of Patent: Apr. 30, 2024

(54) METHOD AND APPARATUS FOR MANUFACTURING AN OBJECT BY MEANS OF ADDITIVE MANUFACTURING

(71) Applicant: Additive Industries B.V., Eindhoven (NL)

(72) Inventors: Mark Herman Else Vaes, Eindhoven (NL); Adrie Boverhof, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 289 days.

(21) Appl. No.: 17/369,155

(22) Filed: Jul. 7, 2021

(65) Prior Publication Data

US 2022/0009155 A1    Jan. 13, 2022

(51) Int. Cl.
| | |
|---|---|
| *B29C 64/10* | (2017.01) |
| *B29C 64/205* | (2017.01) |
| *B29C 64/255* | (2017.01) |
| *B29C 64/393* | (2017.01) |
| *B33Y 10/00* | (2015.01) |
| *B33Y 50/02* | (2015.01) |
| *B22F 10/38* | (2021.01) |
| *B22F 12/70* | (2021.01) |

(52) U.S. Cl.
CPC ............ *B29C 64/10* (2017.08); *B29C 64/205* (2017.08); *B29C 64/255* (2017.08); *B29C 64/393* (2017.08); *B33Y 10/00* (2014.12); *B33Y 50/02* (2014.12)

(58) Field of Classification Search
CPC ..... B29C 64/10; B29C 64/205; B29C 64/255; B29C 64/393; B29C 64/153; B33Y 10/00; B33Y 50/02; B33Y 30/00; Y02P 10/25; B22F 10/28; B22F 10/30; B22F 10/31; B22F 10/32; B22F 10/322; B22F 10/368; B22F 10/38; B22F 10/77; B22F 12/13; B22F 12/17; B22F 12/63; B22F 12/67; B22F 12/70; B22F 12/90; B22F 2999/00

USPC .......................................................... 700/98
See application file for complete search history.

(56) References Cited

U.S. PATENT DOCUMENTS

| | | | |
|---|---|---|---|
| 2011/0165340 A1 | 7/2011 | Baumann | |
| 2017/0056970 A1* | 3/2017 | Chin ...................... | B22D 11/01 |
| 2018/0117675 A1 | 5/2018 | Foret et al. | |

FOREIGN PATENT DOCUMENTS

NL        2013861 B1    10/2016

OTHER PUBLICATIONS

European Office Action dated Sep. 4, 2023; European Application No. 21184596.1.

* cited by examiner

*Primary Examiner* — Michael J Brown
(74) *Attorney, Agent, or Firm* — Suiter Swantz IP

(57) ABSTRACT

An apparatus for producing an object by additive manufacturing layer by layer in a layer sequence. The apparatus includes a process chamber for receiving a bath of powdered material, a support for positioning the object in relation to a surface level of the bath of powdered material, a solidifying device for solidifying a selective layer-part of the powdered material, and a control unit for adjusting for individual layers in the layer sequence, a setting of at least one process parameter, during the manufacture of the object. A method, performed by the apparatus, including the step of adjusting, by the control unit, for individual layers in the layer sequence, the setting of at least one process parameter, during the manufacture of the object.

30 Claims, 9 Drawing Sheets

METHOD AND APPARATUS FOR MANUFACTURING AN OBJECT BY MEANS OF ADDITIVE MANUFACTURING

TECHNICAL FIELD AND BACKGROUND

According to a first aspect, the present disclosure relates to a method for producing an object by an additive manufacturing process.

According to a second aspect, the present disclosure relates to an apparatus for producing an object by an additive manufacturing process.

3D printing or additive manufacturing refers to any of various processes for manufacturing a three-dimensional object in which material is joined or solidified under computer control to create a three-dimensional object, with material being added together, typically layer by layer.

In order to print a three-dimensional object, a printable model is to be created with a computer design package or via a 3D scanner, for example. Usually, the input is a 3D CAD file. Before printing the object from a CAD file, the file is to be processed by a piece of software, which converts the model into a series of thin subsequent layers. Further, apparatus settings and vectors are generated for controlling the creation of each of the subsequent layers. By doing so, a job file may be created for the purpose of executing a build job for manufacturing of the object.

One of the challenges in the manufacturing of three dimensional objects, in particular in additive manufacturing of metal objects, is how to realize relative low manufacturing costs while allowing to realize a relative high object quality.

To reduce operational costs of the apparatus, it is an object to as much as possible utilize the capacity of the apparatus and, at the same time, make sure that the total object lead time of a three dimensional object is minimized while realizing a relative high quality of the object manufactured.

It is an object to provide an apparatus and a method that allows to realize relative low manufacturing costs while allowing to realize a relative high object quality, or at least without compromising object quality.

BRIEF SUMMARY

To this end, the present disclosure provides a method for manufacturing an object by additive manufacturing layer by layer in a layer sequence. The method is performed by an apparatus and includes a step of adjusting, by a control unit of the apparatus, for individual layers in the layer sequence, a setting of at least one process parameter, during the manufacture of the object.

The method according to the first aspect of the present disclosure relies at least partly on the insight that relative low manufacturing costs in combination with a relative high object quality is realized when the setting of at least one process parameter is adjusted for individual layers in the layer sequence. It was noted that in a known method, wherein the process parameters used for manufacturing an object are set only once, before starting the manufacture of the object, the productivity and/or the product quality may be hampered.

Within the context of the present disclosure, adjusting the setting of the at least one process parameter during the manufacture is to be understood as changing the value of the setting of the at least one process parameter to a setting that was not predetermined before the start of executing the build job from a previous setting of the at least one process parameter that was set before the start of executing the build job, by the apparatus, for manufacturing of the object.

It is noted, that the value set, before the start of executing the build job, of the at least one process parameter may differ for different layers of the layer sequence. The present disclosure is also related to adjusting the setting of the values of the at least one process parameter set, before the start of executing the build job, for the different layers of the layer sequence. In other words, predetermined settings of the at least one process parameter for different layers or sections of a layer may be predetermined before the start of the executing of the build job.

By setting the process parameters only once, it may occur that the process parameters are set for realizing a relative high quality, thereby manufacturing relative less critical sections of the object with settings identical to the process parameters required for relative critical sections of the object resulting in a relative low productivity. Alternatively, when setting the process parameters such that a relative high productivity may be realized, relative critical sections of the object may have a relative low quality thereby hampering product quality.

By adjusting at least one process parameter for individual layers in the layer sequence, relative critical sections of the object may be manufactured with process parameters that differ from process parameters used for manufacturing sections of the object, or support structures for supporting the object in the bath of powdered material, that are less critical to the product quality.

Preferably, the method according to the present disclosure includes the step of determining, by a determining unit, for individual layers of the layer sequence, predetermined settings of at least one process parameter.

Determining for individual layers of the layer sequence predetermined settings of at least one process parameter is beneficial for allowing to realize relative low manufacturing costs while allowing to realize a relative high object quality, or at least without compromising object quality.

Preferably, the at least one process parameter is selected from the group consisting of a temperature of a gas present in a process chamber of the apparatus, a flow rate and/or a flow speed of the gas present in the process chamber, a relative humidity of the gas present in the process chamber, a pressure in the process chamber, an oxygen level in the process chamber, a flow of the gas through the process chamber, a temperature of a bath of powdered material provided in the process chamber, a temperature of a build plate supporting the layer sequence at a lower side thereof, a speed at which a surface level of an individual layer in the layer sequence is leveled, a number of swipes for supplying an individual layer in the layer sequence, a quantity of powdered material used for providing an individual layer in the layer sequence, a number of successive layers after which a powdered material reservoir of the apparatus needs to be refilled with powdered material, an extraction rate of extracting a mixture of the gas and waste particles from the process chamber, a filtering rate of filtering the mixture of the gas and waste particles from the process chamber, and an alignment accuracy of solidifying powdered material at the surface level for manufacturing the object.

Within the context of the present disclosure, the process chamber is to be understood as a chamber arranged for receiving a bath of powdered material which can be solidified when being present in the processing chamber for manufacturing the object. During manufacturing, the layer sequence is being realized in a part of the process chamber.

The present disclosure at least partly relies on the insight that maintaining the conditions of the gas such as the temperature, the flow rate and/or the flow speed, the relative humidity, the pressure in the process chamber and the oxygen level in the process chamber within a relative narrow range during the manufacture of the object may be beneficial for realizing a relative high object quality, but may result in relative high manufacturing costs. By adjusting the conditions of the gas in the process chamber during the manufacture of the object, the need for maintaining the conditions of the gas in the process chamber in a predetermined range or even at a predetermined value during substantially the full manufacturing time or during a processing of a complete layer of the layer sequence is avoided. Instead, by adjusting the conditions of the gas during the build of the object, the gas conditions may be maintained in a very narrow range or even a predetermined value when processing a layer or a section of a layer considered relatively critical for the manufacturing quality and allowing the gas conditions to vary over a broader range or even at a different value when processing a layer or a section of a layer that is considered less critical.

In addition, the process parameters related to the condition of the gas in the process chamber may be adjusted taking into account a characteristic of the object related to an individual layer or a section of a layer of the layer sequence. As an example, instead of maintaining a process parameter relatively constant during the build of the object, the gas conditions may be adjusted during the manufacture of the object to arrive at a relative high product quality while realizing relative low manufacturing cost.

It is noted, that it is known that a three-dimensional object may be produced in an environment comprising a relative high level of inert gas for reducing oxidization of the material during solidification, thereby increasing the quality of the produced object.

The present disclosure further at least partly relies on the insight that, by adjusting the oxygen level in the process chamber, the material properties of the object may be adjusted throughout the object. By varying the oxygen level, different parts of the object may have a different hardness and brittleness, for example.

An additional advantage of the method according to the present disclosure, wherein the oxygen level in the process chamber is adjusted, during manufacturing of the object, is that that execution of the build job may be started when the oxygen level in the process chamber is relatively high while still realizing a relative high object quality. This is beneficial for realizing relative low manufacturing costs. It is noted that the lower layers of the layer sequence may be of relative low importance to the object and may even be sacrificed when removing the object from the build plate. During manufacturing of these lower layers of the layer sequence, the oxygen level in the process chamber may be reduced such that when a relative critical part of the object or a layer comprising a layer-part of the object is processed the oxygen level meets a predetermined relative low level for realizing a relative high object quality. In other words, using the method according to the present disclosure there is no need for completely purging the process chamber for arriving at a relative low oxygen level in the process chamber.

Within the context of the present disclosure, a relative low oxygen level in the process chamber is to be understood as an oxygen level in the range of 1 ppm to 1000 ppm.

The present disclosure further at least partly relies on the insight that when using a relatively small amount of inert gas, the oxygen level may become relatively high due to leakage of air into process chamber in combination with a relative low supply rate of inert gas. A relative high oxygen level may have a substantial negative effect on the product quality. A relative high product quality may be obtained by supplying a relatively large amount of inert gas. A drawback of a relatively large supply of inert gas throughout the build of the object is that the manufacturing costs are relatively high. The method according to the present disclosure allows to adjust the oxygen level in the build chamber during the build thereby allowing to realize a relative high product quality at relative low manufacturing costs.

Within the context of the present disclosure, the build plate is to be understood as an assembly or element arranged for providing a surface for the bottom layer of the layer sequence. During the build of the object, the build plate supports the layer sequence at a lower side thereof. Heating the powdered material in the process chamber, during the manufacture of the object, may be beneficial for realizing a relative high product quality. The powdered material may for instance be heated via the build plate.

In addition, the present disclosure at least partly relies on the insight that maintaining the temperature of the build plate within a relative narrow range during the manufacture of the object may be beneficial for realizing a relative high object quality, but may result in relative high manufacturing costs. By adjusting the temperature of the build plate during the manufacture of the object, the need for maintaining the temperature of the build plate in a predetermined range or even at a predetermined value during substantially the full manufacturing time is avoided. Instead, by adjusting the temperature of the build plate during the build of the object, the temperature of the powdered material at the surface level may be maintained in a very narrow range or even at a predetermined value throughout the manufacture of the object.

It is noted that the temperature of the build plate may need to be increased for an increasing total height of the layer sequence to maintain a relative constant temperature of the powdered material at the surface level.

Alternatively, it is observed that, via heating of the build plate, the temperature of lower layers of the layer sequence, during manufacturing of the object, may become higher than the temperature of higher layers of the layer sequence. As a result of this temperature difference, the material properties may vary throughout the object.

An additional advantage of the method according to the present disclosure, wherein the temperature of the build plate supporting the layer sequence at a lower side thereof is adjusted, during manufacturing of the object, is that that temperature of the build plate may be reduced during manufacturing of the object, thereby realizing more homogeneous material properties throughout the object.

The present disclosure further at least partly relies on the insight that maintaining process parameters that are related to the supply of a layer of the layer sequence, such as the speed at which a surface level of an individual layer in the layer sequence is leveled, the number of swipes for supplying an individual layer in the layer sequence, the quantity of powdered material used for providing an individual layer in the layer sequence and the number of successive layers after which a powdered material reservoir of the apparatus needs to be refilled with powdered material, within a relative narrow range during the manufacture of the object may be beneficial for realizing a relative high object quality, but may result in relative high manufacturing costs. By adjusting the conditions of the process parameters related to the supply of a layer of the layer sequence during the manufacture of the object, the need for maintaining the process parameters that are related to the supply of a layer or section of a layer of the layer sequence in a predetermined range or even at a predetermined value during substantially the full manufacturing time is avoided. Instead, by adjusting the process parameters that are related to the supply of a layer of the layer sequence during the build of the object, the process parameters that are related to the supply of a layer of the layer sequence may be maintained in a very narrow range or even a predetermined value when supplying a layer or a section of a layer considered relatively critical for the manufacturing quality and allowing the process parameters that are related to the supply of a layer of the layer sequence to vary over a broader range or even at a different value when supplying a layer or a section of a layer that is considered less critical.

In addition, the process parameters that are related to the supply of a layer of the layer sequence may be adjusted taking into account a characteristic of the object related to an individual layer or section of an individual layer of the layer sequence. As an example, instead of maintaining a process parameter relatively constant during the build of the object, the process parameters that are related to the supply of a layer of the layer sequence may be adjusted during the manufacture of the object to arrive at a relative high product quality while realizing relative low manufacturing cost.

The speed at which a surface level of an individual layer or a section of the individual layer in the layer sequence is supplied and/or levelled, for instance by displacement of a recoating unit of the apparatus along the surface level of the bath of powdered material, may be adjusted during the production of the object, in dependence of a position of the recoating unit along the surface level and/or in dependence of a distance between the surface level and the build plate. The speed at which a layer of the layer sequence is supplied may affect the product quality such that a relative high speed may for instance result in a relative low object quality and a relative low speed may for instance result in a relative high object quality.

Within the context of the present disclosure the number of swipes for supplying an individual layer in the layer sequence is to be understood as the number of times the recoating unit moves along the surface of the bath of powdered material for supplying a layer of the layer sequence. The displacement of the levelling unit from one side to the opposing side of the bath of material may be referred to as a stroke of a strike.

The waste particles may originate from solidification of powdered material of the bath of powdered material either directly or after condensation of gasses resulting the solidification. It is known that these waste particles may affect the product quality in that a relatively large concentration of waste particles in the process chamber may for instance result in a relative low object quality. By adjusting the extraction rate of extracting a mixture of the gas and waste particles from the process chamber during the manufacture of the object, the product quality may be influenced.

Filtering the extracted mixture of gas and waste particles is advantageous for allowing the gas to be re-used, for instance via recycling, in the process chamber, while allowing for the waste particles to be collected in a filter device. Recycling the mixture of gas and waste particles is relatively unattractive due to the increase of waste particles in the gas mixture upon recycling the mixture thereby affecting the quality of the object manufactured.

By adjusting the filtering rate of filtering the mixture of the gas and waste particles from the process chamber, the need for maintaining the filtering rate in a predetermined range or even at a predetermined value during substantially the full manufacturing time is avoided. Instead, by adjusting the filtering rate during the build of the object, the filtering rate may be maintained in a very narrow range or even at a predetermined rate when processing a layer considered relatively critical for the manufacturing quality and allowing the filtering rate to vary over a broader range or even at a different rate, such as a lower rate, when processing a layer or a section of a layer that is considered less critical.

The filtering rate may be adjusted taking into account a characteristic of the object related to an individual layer of the layer sequence. As an example, instead of maintaining the filtering rate relatively constant during the build of the object, the filtering rate may be adjusted during the manufacture of the object to arrive at a relative high product quality while realizing relative low manufacturing cost. It is noted that a relative high filtering rate may result in relative high manufacturing cost for instance due to the need for a more frequent replacement or cleaning of the filtering device.

During manufacturing of the object, an alignment accuracy of solidifying powdered material at the surface level for manufacturing the object may be adjusted. The present disclosure further relies at least partly on the insight that during manufacturing of the object, the alignment accuracy of the solidification may deteriorate for instance due to local heating of the apparatus or hysteresis. In order to realize a relative high object quality, it is beneficial to maintain a relative high alignment accuracy throughout the build of the object for instance by running a calibration procedure during the manufacture of the object.

The calibration procedure may for instance comprise realizing calibration markers in a layer of the layer sequence by solidification of powdered material at the surface level and subsequently using the calibration markers printed for calibration of the apparatus. However, running such a calibration procedure relatively often during the manufacture of the object may result in relative high manufacturing costs for instance due to time required for the calibration procedures.

Alternatively, the apparatus may for instance comprise one or more calibration elements provided near the surface level, wherein the calibration procedure may utilize an image from the calibration elements for calibration of the apparatus as is disclosed in patent application NL2013861 which is hereby incorporated by reference.

By adjusting the alignment accuracy of solidifying powdered material at the surface level during the manufacture of the object, the need for maintaining the alignment accuracy in a predetermined range or even at a predetermined value during substantially the full manufacturing time is avoided. Instead, by adjusting the alignment accuracy, such as improving the alignment accuracy by running the calibration procedure, the alignment accuracy may be maintained relatively high when solidifying a layer or a section of a layer considered relatively critical for the manufacturing quality and allowing the alignment accuracy to vary over a broader range or even at a different value when solidifying a layer or a section of a layer that is considered less critical.

Preferably, the step of adjusting the setting of the at least one process parameter is performed for a section of an individual layer of the layer sequence. This embodiment of the method according to the present disclosure relies at least partly on the insight that valuable machine time and thus manufacturing cost may be saved by varying the at least one process parameter for a section of an individual layer of the layer sequence while allowing to realize a relatively high object quality, or at least without compromising object quality.

The required local layer quality may for instance be adjusted for a section of an individual layer, because layer sections of a lower required quality may be levelled at a higher speed and thus in a shorter amount of time. A section of a layer that does not comprise a layer-part, which, after the solidifying thereof, will be a part of the object, or does not comprise a layer-part that will be solidified, may be levelled and/or supplied at a relative high speed. The section of a layer comprising a layer-part which, after the solidifying thereof, will be a part of the object, may be levelled and/or supplied at a lower speed compared to the further sections for example, thereby realizing a relative high object quality while still limiting machine time.

A speed at which a surface level of an individual layer in the layer sequence is leveled may be adjusted in dependence of structural properties of the object at specific positions along the surface level. For example, at a so-called up-skin of the object, which is an upper side of an inclined object surface portion, the speed at which a surface level of an individual layer in the layer sequence is leveled and/or supplied may be increased, while at a so-called down-skin of the object, which is a lower side of an inclined object surface portion to be formed, the speed at which a surface level of an individual layer in the layer sequence is leveled and/or supplied may be decreased, since such a down-skin object surface portion is more critical since for example it is more prone to surface defects.

A speed at which a surface level of an individual layer in the layer sequence is leveled and/or supplied may be adjusted in dependence of structural properties of some support structure at specific positions along the surface level. A support structure may be formed while also forming the object, for the purpose of supporting the object while manufacturing. This may in particular be at issue in case of some overhanging object portion.

In this regard, it is noted that for an object having a height of 100 mm, for example, typically several hundred up to a few thousand layers are needed. Levelling one layer may typically take from half a second up to a few seconds. Thus, by decreasing the time needed to level a single layer in accordance with the present disclosure, a significant overall machine time reduction may be achieved. Thus, with the method according to the present disclosure, the above object is achieved. The method according to the invention achieves relative low manufacturing costs without compromising object quality.

Preferably, the step of adjusting the setting of the at least one process parameter is performed for an individual layer of the layer sequence during processing of the individual layer. This is beneficial for allowing the parameters to be adjusted taking into account a characteristic of the object related to the individual layer of the layer sequence thereby allowing to realize relative low manufacturing costs and a relative high object quality, or at least without compromising object quality.

It is beneficial if the method further includes a step of receiving, by a receiving unit of the apparatus, during manufacturing of the object, an input related to the setting of the at least one process parameter. This is for instance beneficial for allowing an operator of the apparatus to adjust the at least one process parameter during the manufacture of the object. The operator may for instance feel the need to adapt the setting of the at least one process parameter taking into account a visual observation of the solidification process. Alternatively, the receiving unit may allow for receiving the input from a processing unit.

In an embodiment of the method according to the present disclosure, the method further includes a step of outputting the setting of the at least one process parameter for at least a part of the layer sequence for display.

Outputting the setting for display is beneficial for allowing an operator of the apparatus to obtain information about an actual setting of the at least one process parameter during the manufacture of the object. The operator may for instance feel the need to adjust the setting of the at least one process parameter taking into account the information obtained or even terminate the manufacture of the object.

Preferably, the method further includes the steps of supplying, by a supply unit of the apparatus, a quantity of powdered material to the bath of powdered material provided in the process chamber, levelling, by a levelling unit of the apparatus, the surface level of the bath of powdered material, and solidifying, by a solidifying device of the apparatus, a selective layer-part of the surface level of the bath of powdered material for realizing a layer in the layer sequence of the object.

It is advantageous if the method further includes a step of retrieving, by the control unit of the apparatus, from a register of the apparatus or at least related to the apparatus, historical data related to the setting of the at least one process parameter for manufacturing the object, and wherein, during the step of adjusting the setting of the at least one process parameter, the setting of the at least one process parameter is adjusted taking into account the historical data.

Retrieving historical data and adjusting the setting taking into account the historical data is beneficial for allowing to continuously improve the manufacturing of subsequent similar or identical objects as regards object quality and manufacturing costs.

Preferably, the historical data comprised by the register is related to an apparatus. Relating the historical data to a specific apparatus is beneficial for allowing to continuously improve the manufacturing of subsequent similar or identical objects at different apparatuses wherein the register includes historical data for at least two apparatuses.

In an embodiment of the method according to the present disclosure, the method further includes the steps of further receiving, by the register of the apparatus or at least related to the apparatus, from the control unit of the apparatus, the setting of at least one process parameter for manufacturing the object, and adding, by the register of the apparatus or at least related to the apparatus, the received setting of the at least one process parameter to the historical data related to the at least one process parameter for manufacturing the object.

Adding the setting, received by the register, of the at least one process parameter to the historical data comprised by the register is beneficial for allowing to continuously improve the manufacturing of subsequent similar or identical objects as regards object quality and manufacturing costs. Moreover, incorporating the received setting of the at least on process parameter in the register is beneficial for post-manufacturing analysis of the object quality realized in relation to the at least one process parameter.

Preferably, the method according to the first aspect further includes a step of detecting, by a detection unit of the apparatus, during manufacturing of the object, an actual value related to the at least one process parameter, and wherein, during the step of adjusting the setting of the at least one process parameter, the setting of the at least one process parameter is adjusted taking into account the actual value related to the at least one process parameter detected, by the detection unit, during the step of detecting.

The step of detecting in combination with the step of adjusting taking into account the detected actual value is beneficial for improving control of the at least one process parameter during the manufacture of the object thereby allowing to realize a relative high object quality at relative low manufacturing cost.

In this regard, it is advantageous if the method further includes the steps of yet further receiving, by the register of the apparatus or at least related to the apparatus, from the control unit of the apparatus, the actual value related to the at least one process parameter, and further adding, by the register of the apparatus or at least related to the apparatus, the received actual value of the at least one process parameter to the historical data related to the at least one process parameter for manufacturing the object.

Further adding the actual value of the at least one process parameter, received by the register, to the historical data comprised by the register is beneficial for allowing to continuously improve the manufacturing of subsequent similar or identical objects as regards object quality and manufacturing costs. Moreover, incorporating the actual value in the register is beneficial for post-manufacturing analysis of the object quality realized in relation to the at least one process parameter.

Preferably, the method further includes the steps of transmitting, by the control unit of the apparatus or the detection unit of the apparatus, the actual value related to the at least one process parameter to a processing unit, and determining, by the processing unit, an expected future value of the at least one process parameter taking into account the actual value related to the at least one process parameter received during the step of transmitting, wherein, during the step of adjusting the setting of the at least one process parameter, the setting of the at least one process parameter is adjusted taking into account the expected future value of the at least one process parameter determined, by the processing unit, during the step of determining.

Transmitting the actual value to a processing unit and determining, by the processing unit, an expected future value is beneficial for realizing a feed forward control of the at least one process parameter. The operator may for instance, taking into account the future expected value of the at least one process parameter to adjust the at least one process parameter before the expected future value actually occurs and thereby realize a relative high object quality at relative low manufacturing cost.

Preferably, the method includes the step of receiving, by the control unit, the expected future value of the at least one process parameter, wherein during the step of adjusting the setting of the at least one process parameter, the setting of the at least one process parameter is adjusted taking into account the expected future value of to the at least one process parameter determined, by the processing unit, during the step of determining.

It is advantageous if, during the step of adjusting, the setting of the at least one process parameter is adjusted according to the predetermined settings. This is beneficial for allowing to realize relative low manufacturing costs while allowing to realize a relative high object quality, or at least without compromising object quality.

In an embodiment of the method according to the present disclosure the step of determining is performed before the step of solidifying, wherein during the step of solidifying a first selective layer-part of the powdered material is solidified for producing the object.

According to the second aspect, the present disclosure relates to an apparatus for producing an object by means of additive manufacturing layer by layer in a layer sequence. The apparatus includes a process chamber for receiving a bath of powdered material configured to be solidified, a support for positioning the object in relation to a surface level of the bath of powdered material, a solidifying device for solidifying a selective layer-part of the powdered material, and a control unit arranged for adjusting for individual layers in the layer sequence, a setting of at least one process parameter, during the manufacture of the object.

Embodiments of the apparatus according to the second aspect are also applicable to the method according to the first aspect of the present disclosure, and vice versa. Effects of the apparatus according to the second aspect correspond to or are similar to effects of the method according to the first aspect of the present disclosure presented above. Effects of the method according to the first aspect as presented above correspond to or are similar to effects of the apparatus according to the second aspect of the present disclosure.

Preferably, the apparatus includes a determining unit arranged for determining, for individual layers of the layer sequence, predetermined settings of at least one process parameter. This is beneficial for allowing to realize relative low manufacturing costs while allowing to realize a relative high object quality, or at least without compromising object quality.

Preferably, the at least one process parameter is selected from the group consisting of a temperature of a gas present in the process chamber, a flow rate and/or a flow speed of the gas present in the process chamber, a relative humidity of the gas present in the process chamber, a pressure in the process chamber, an oxygen level in the process chamber, a flow of a gas through the process chamber, a temperature of the bath of powdered material, a temperature of a build plate supporting the layer sequence at a lower side thereof, a speed at which a surface level of an individual layer in the layer sequence is leveled, a number of swipes for supplying an individual layer in the layer sequence, a quantity of powdered material used for providing an individual layer in the layer sequence, a number of successive layers after which a powdered material reservoir of the apparatus needs to be refilled with powdered material, an extraction rate of extracting a mixture of the gas and waste particles from the process chamber, a filtering rate of filtering the mixture of the gas and waste particles from the process chamber, and an alignment accuracy of the solidifying device for solidifying the selective layer-part of the powdered material for manufacturing the object.

Preferably, the control unit is further arranged for adjusting the setting of the at least one process parameter for a section of an individual layer of the layer sequence during manufacturing of the individual layer. This embodiment of the apparatus according to the present disclosure relies at least partly on the insight that valuable machine time and thus manufacturing cost may be saved by varying the at least one process parameter for a section of an individual layer of the layer sequence while allowing to realize a relative high object quality, or at least without compromising object quality.

In an embodiment of the apparatus according to the second aspect, the control unit is further arranged for adjusting the setting of the at least one process parameter for an individual layer of the layer sequence during processing of the individual layer. This is beneficial for realizing an apparatus that allows the parameters to be adjusted taking into account a characteristic of the object related to the individual layer of the layer sequence, thereby allowing to realize relative low manufacturing costs and a relative high object quality, or at least without compromising object quality.

It is advantageous, if the apparatus includes a receiving unit arranged for receiving, during manufacturing of the object, preferably from an operator, an input related to the setting of the at least one process parameter.

This is for instance beneficial for allowing an operator of the apparatus to adjust the at least one process parameter during the manufacture of the object. The operator may for instance feel the need to adjust the setting of the at least one process parameter taking into account a visual observation of the solidification process. Alternatively, the receiving unit may allow for receiving the input from a processing unit.

Preferably, the apparatus is arranged for outputting the setting of the at least one process parameter for at least a part of the layer sequence for display.

Outputting the setting for display is beneficial for allowing an operator of the apparatus to obtain information about an actual setting of the at least one process parameter during the manufacture of the object. The operator may for instance feel the need to adjust the setting of the at least one process parameter taking into account the information obtained or even terminate the manufacture of the object.

It is beneficial if the apparatus is provided with a recoating device, the recoating device including a supply unit comprising the powdered material reservoir for supplying a layer of powdered material to the bath of powdered material, and a levelling unit which is arranged to be displaced along the surface level of the bath of powdered material for levelling the surface level of the bath of powdered material.

Preferably, the apparatus further is provided with a register, communicatively coupled to the control unit, comprising historical data related to the setting of the at least one process parameter for manufacturing the object, wherein the control unit is further arranged for retrieving from the register of the apparatus, the historical data related to the setting of the at least one process parameter for manufacturing the object and adjusting the setting of the at least one process parameter taking into account the historical data.

Providing the apparatus with a register is beneficial for allowing to continuously improve the manufacturing of subsequent similar or identical objects as regards object quality and manufacturing costs.

In this regard, it is advantageous if the register is arranged for receiving, from the control unit, the setting of the at least one process parameter for manufacturing the object and wherein the register is further arranged for adding, the setting of the at least one process parameter, received from the control unit, to the historical data related to the at least one process parameter for manufacturing the object.

The register being arranged for receiving and adding the setting of the at least one process parameter to the historical data comprised by the register is beneficial for allowing to continuously improve the manufacturing of subsequent similar or identical objects as regards object quality and manufacturing costs.

In an embodiment of the apparatus according to the second aspect, the apparatus further includes a detection unit, communicatively coupled to the control unit, arranged for detecting, during manufacturing of the object, an actual value related to the at least one process parameter and wherein the control unit is arranged for adjusting the setting of the at least one process parameter taking into account the actual value related to the at least one process parameter detected by the detection unit.

Preferably, the detection unit includes at least one of a temperature detector arranged and provided for detecting the temperature of the gas present in the process chamber of the apparatus, a flow rate detector arranged and provided for detecting the flow rate and/or the flow speed of the gas present in the process chamber, a humidity detector arranged and provided for detecting the relative humidity of the gas present in the process chamber, a pressure detector arranged and provided for detecting the pressure in the process chamber, an oxygen detector arranged and provided for detecting the oxygen level in the process chamber, a further temperature detector arranged and provided for detecting the temperature of a bath of powdered material provided in the process chamber, and another temperature detector arranged and provided for detecting the temperature of a build plate supporting the layer sequence at a lower side thereof.

The apparatus comprising a register is advantageous for allowing to further improve control of the at least one process parameter, during the manufacture of the object, thereby allowing to realize a relative high object quality at relative low manufacturing cost.

In this regard, it is beneficial if the register is further arranged for receiving, from the control unit, the actual value related to the at least one process parameter and wherein the register is further arranged for adding, the actual value related to the at least one process parameter, received from the control unit, to the historical data related to the at least one process parameter for manufacturing the object.

The apparatus being arranged for adding the actual value of the at least one process parameter, received by the register, to the historical data comprised by the register, is beneficial for allowing to continuously improve the manufacturing of subsequent similar or identical objects as regards object quality and manufacturing costs. Moreover, incorporating the actual value in the register is beneficial for post-manufacturing analysis of the object quality realized in relation to the at least one process parameter.

Preferably, the apparatus further includes a processing unit, communicatively coupled to at least the control unit of the apparatus or the detection unit of the apparatus, arranged for determining an expected future value of the at least one process parameter taking into account the actual value related to the at least one process parameter, wherein the control unit is further arranged for adjusting for individual layers in the layer sequence, the setting of the at least one process parameter, during the manufacture of the object, taking into account the expected future value of the at least one process parameter.

Providing a processing unit arranged for determining an expected future value is beneficial for realizing a feed forward control of the at least one process parameter. The operator may for instance, taking into account the future expected value of the at least one process parameter to adjust the at least one process parameter before the expected future value actually occurs and thereby realize a relative high object quality at relative low manufacturing cost.

It is beneficial, if the apparatus includes a climate regulation unit, communicatively coupled to the control unit, and arranged for, taking into account the setting of the at least one process parameter, regulating at least one of the temperature of gas present in the process chamber, the flow rate and/or the flow speed of gas present in the process chamber, the relative humidity of gas present in the process chamber, the pressure inside the process chamber, the oxygen level in the process chamber, the flow of gas through the process chamber, the temperature of the bath of powdered material, and the temperature of the build plate supporting the layer sequence at a lower side thereof.

Preferably, the apparatus includes a gas supply unit, communicatively coupled to the control unit, arranged for supplying the gas to the process chamber and optionally for regulating the oxygen level in the gas and/or a flow of the gas through the process chamber taking in to account the setting of the at least one process parameter.

Preferably, the apparatus according to the second aspect further includes an extracting device for extracting a mixture of gas and the waste particles from the process chamber.

Preferably, the apparatus according to the second aspect further includes a filter device arranged for collecting the waste particles from the extracted mixture of the gas and the waste particles.

It is advantageous, if the control unit is arranged for setting of the at least one process parameter according to the predetermined settings. This is beneficial for allowing to realize relative low manufacturing costs while allowing to realize a relative high object quality, or at least without compromising object quality.

Preferably, the apparatus is arranged for determining, by the determining unit, for individual layers of the layer sequence, the predetermined settings of the at least one process parameter before solidifying a first selective layer-part of the powdered material for producing the object.

BRIEF DESCRIPTION OF THE DRAWINGS

Embodiments of the method and apparatus according to the present disclosure will next be explained by means of the accompanying schematic figures, wherein.

DETAILED DESCRIPTION

Figure 1:
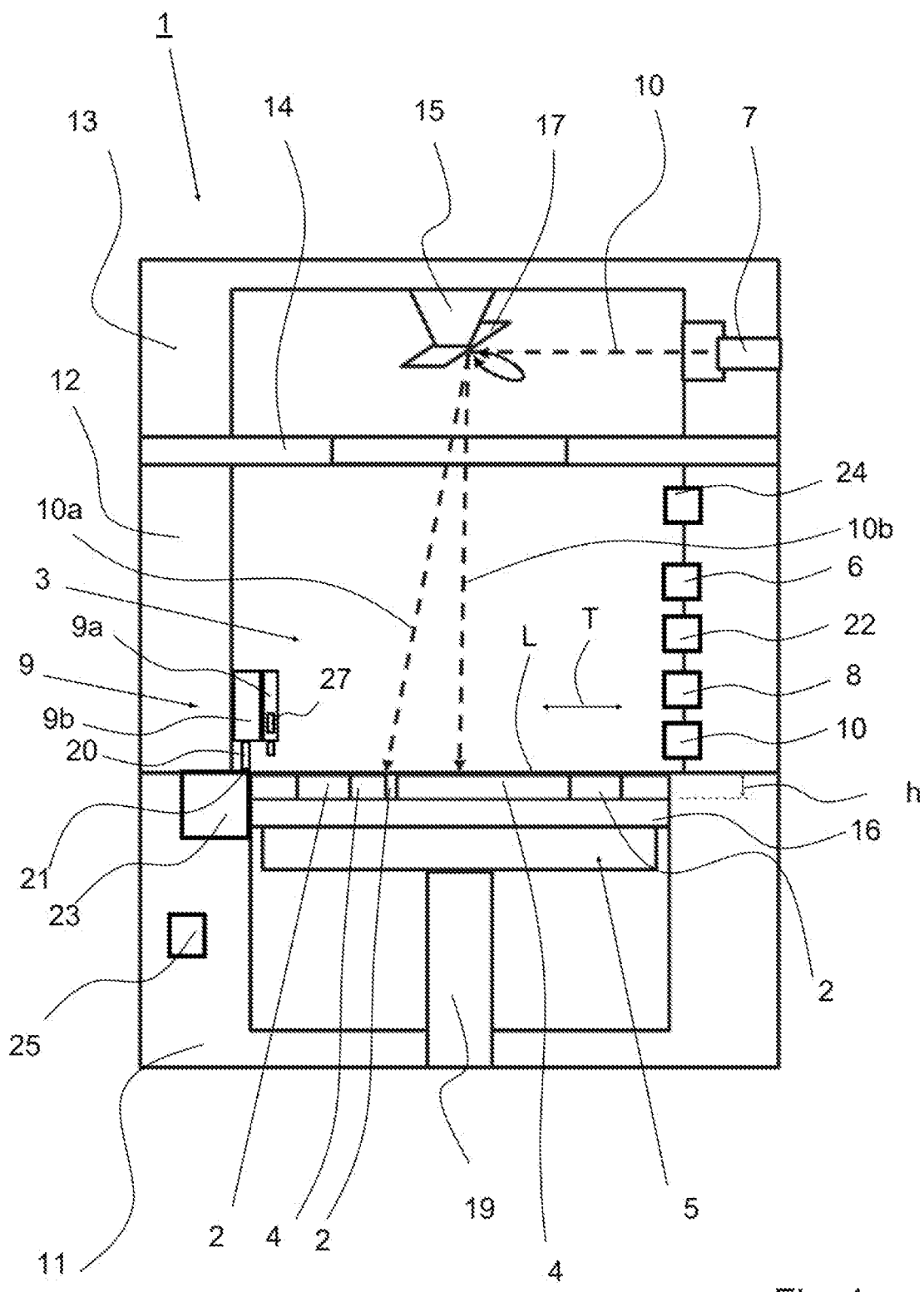
FIG. 1 shows a vertical cross section of an embodiment of an apparatus according to the second aspect of the present invention.

FIG. 1 shows an overview of an apparatus 1 for producing an object 2 by means of additive manufacturing, in accordance with the present invention. The apparatus 1 is built from several frame parts 11, 12, 13. The apparatus 1 includes a process chamber 3 for receiving a bath of powdered material 4 which can be solidified. The process chamber 3 may be substantially air tight and is bounded at an upper side by an upper wall 14 which is arranged for allowing electromagnetic radiation to enter the process chamber 3 through a window provided in the upper wall 14. The process chamber 3 is bounded at the four sides by side walls, of which only a left side wall and a right-side wall are shown, in the view of FIG. 1. The bath of powdered material 4 is provided from a supply container 23, which is a stationary storage for powdered material of the apparatus 1.

In a lower frame part 11, a shaft 19 is provided, wherein a support 5 is provided for positioning the object 2 (or even objects), or at least the object(s) to be produced, in relation to the surface level L of the bath of powdered material 4. The distance between the upper wall 14 and the surface level L is maintained substantially constant, preferably constant, during manufacturing of the object 2. The support 5 is movably provided on the shaft 19, such that after solidifying a layer of the object 2 to be produced, the support 5 may be lowered, additional powdered material may be supplied to the bath of powdered material 4 and levelled by a recoating device 9, and a further layer-part of the bath of powdered material 4 may be solidified on top of the part of the object 2 already formed. A build plate 16 is provided on the support 5 and arranged for supporting the layer sequence at a lower side thereof. The build plate 16 is provided with heating elements (not shown) for heating the bath of powdered material 4 via the build plate 16.

In a top part 13 of the apparatus 1, a solidifying device 7 is provided for solidifying a selective layer-part of the bath of powdered material 4. In the embodiment shown, the solidifying device 7 is a laser device, which is arranged for producing electromagnetic radiation in the form of laser light, in order to locally melt the bath of powdered material 4 provided on the support 5, i.e. to melt a layer-part, which then, after cooling, forms a solidified part of the object 2 to be produced. However, the invention is not limited to the type of solidifying device. As can be seen, the electromagnetic radiation 10 emitted by the laser device 7 is deflected by means of a deflector unit 15, which uses a rotatable optical element 17 to direct the emitted radiation 10 towards the surface of the layer-part of the bath of powdered material 4. Depending on the position of the deflector unit 15, radiation may be emitted, as an example, according to rays 10a, 10b.

Apparatus 1 is further provided with a gas supply unit 6 and a climate regulation unit 8. The gas supply unit 6 is arranged for providing or flushing an inert gas such as argon or nitrogen into or through the process chamber 3. The climate regulation unit 8 is communicatively coupled to the gas supply unit 6 and arranged for regulating the temperature of gas present in the process chamber 3, the flow rate and the flow speed of gas present in the process chamber 3, the relative humidity of gas present in the process chamber 3, the pressure inside the process chamber 3, the oxygen level in the process chamber 3, the flow of gas through the process chamber 3. In addition, the climate regulation unit 8 is communicatively coupled to the heating elements of the build plate and arranged for regulating the temperature of the build plate 16 provided on the support 5 and supporting the layer sequence at a lower side thereof. In an embodiment of the apparatus 1 the climate regulation unit is arranged for regulating only one or a sub-set of the process parameters regulated by climate regulation unit 8.

Apparatus 1 is provided with an extracting device 22 and a filter device 24. The extraction device 22 is formed as a fan for extracting the mixture of gas and waste particles from the process chamber 3 via an extraction connection (not shown). The extracted mixture of gas and waste particles is directed to the filter device 24 for separating waste particles from the gas before returning the gas back via a return line (not shown) into the process chamber 3.

The extraction rate, realized by the fan, may be adjusted by adjusting a setting of for instance a rotation speed of the fan. The filtering rate of the filter device 24 may be adjusted by adjusting for instance an interval between cleaning procedures for cleaning the filter device 24, thereby increasing, at least temporarily, the filtering rate. The cleaning procedure may for instance comprise vibrating the filter device 24 for removing waste particles adhering to the filter and/or providing a gas flow to the filter device 24 at a side of the return line thereof and collecting the waste particles in a storage bin (not shown).

The apparatus 1 further includes the recoating device 9 mentioned above, which can be displaced along the surface level L of the bath of material 4 for, horizontally, levelling the surface level L of the bath of material 4. The recoating device 9 can be moved along the surface level L of the bath of powdered material 4, along a horizontal linear trajectory T extending over the bath of powdered material 4. The recoating device 9 has a supply unit 9a and a levelling unit 9b. The levelling unit 9b includes at least one elongated levelling element 20 with a longitudinal edge 21 at a lower free end thereof, facing the surface of the bath of material 4 and arranged to swipe along the surface level L of the bath of material 4 as a result of the displacement of the levelling unit 9b along the surface level L of the bath of material 4, for levelling the surface level L of the bath of material 4.

The supply unit 9a includes a powdered material reservoir (not shown) for supplying a layer of powdered material to the bath of powdered material 4. The supply unit 9a supplies a quantity of powdered material from the powdered material reservoir (not shown) to the bath of powdered material 4 for the purpose of supplying a layer of the powdered material to the bath of powdered material 4. Intermittently, the powdered material reservoir of the supply unit 9a is replenished with powdered material from the container 23.

The supply unit 9a is arranged to be displaced along the surface level L of the bath of powdered material 4 jointly with the levelling unit 9b. For that purpose, both the supply unit 9a and the levelling unit 9b may be provided on a shared sub-frame movable along the surface level L by an arrangement not shown in the figures, which may include a linear guide and a drive unit such as including an electric motor, such as a servomotor, and a spindle, for example, connecting the drive unit to the supply unit 9a and levelling unit 9b (or to the shared sub-frame).

The apparatus 1 further includes a control unit 25, highly schematically shown in FIG. 1. The control unit 25 is arranged for controlling the electromagnetic radiation at the surface level L during solidification. To that end, the control unit 25 is communicatively coupled to the solidifying device 7 and the deflector unit 15. The control unit 25 is further communicatively coupled to the gas supply unit 6, the climate regulation unit 8, the supply unit 9a and the levelling unit 9b.

The control unit 25 is arranged for controlling the displacement of the levelling unit 9b and of the supply unit 9a along the surface level of the bath of powdered material 4. In the example of FIG. 1, the control unit 25 is arranged for controlling the displacement of the supply unit 9a jointly with the levelling unit 9b along the surface level of the bath of material 4, by driving the drive unit, for example.

The control unit 25 is configured such that in use a speed of displacement of the levelling unit 9b along the surface level L of the bath of powdered material 4 is varied during the production of the object 2 or objects 2, in dependence of a position of the levelling unit 9b along the surface level during levelling, and/or a parameter related to a distance h between the surface level L and the support 5. Since the levelling unit 9b is displaced along the linear trajectory T along the surface level, the position of the levelling unit 9b along the surface level L is a position in the direction of displacement, and forward, which may be to the left in the view of FIG. 1, or backward, which will then be to the right in the view of FIG. 1. The parameter related to a distance h may, for example, be or a measure for an actual distance, or may be or be a measure for the actual layer number of a total number of solidified layer-parts solidified to manufacture the object, counted from the bottom layer, which is also a parameter related to the distance between the surface level and the support.

The actual layer is the layer to be solidified which defines the surface level L. For example, layer number X is thus the $X^{th}$ layer from the bottom, which relates to a height position of the layer-part to be solidified and to a distance between the surface level L and the support 5.

The control unit 25 is further arranged for adjusting, during manufacturing of the object 2, for individual layers in the layer sequence, the temperature of gas present in the process chamber 3, the flow rate and the flow speed of the gas present in the process chamber 3, the relative humidity of the gas present in the process chamber 3, the pressure in the process chamber 3, the oxygen level in the process chamber 3, the flow of gas through the process chamber 3, the temperature of the build plate 16 supporting the layer sequence at a lower side thereof, the speed at which the leveling unit 9b is moved along the surface level L for leveling an individual layer in the layer sequence, the number of swipes, by the supply unit 9a, for supplying an individual layer in the layer sequence, a quantity of powdered material used, by the recoating device 9, for providing an individual layer in the layer sequence, a number of successive layers after which the powdered material reservoir 23 of the apparatus 1 needs to be refilled with powdered material, a number of successive layers after which the powdered material reservoir of the supply unit 9a needs to be refilled with powdered material from the powdered material reservoir 23, the extraction rate of extracting the mixture of the gas and waste particles, by the extracting device, from the process chamber 3, the filtering rate of filtering the mixture of the gas and waste particles, by the filtering device, from the process chamber 3 and the alignment accuracy of the solidifying device 7 for solidifying the selective layer-part of the powdered material for manufacturing the object 2.

Apparatus 1 further includes a receiving unit 18 and a display 32. The receiving unit 18 is arranged for receiving, during manufacturing of the object 2, an input related to the setting of the at least one process parameter. The display 32 is arranged for outputting the setting of the at least one process parameter for at least a part of the layer sequence. In an embodiment of the apparatus 1 the display 32 is formed by a touch screen, wherein the receiving unit 18 receives the input via the touch screen.

Apparatus 1 further includes a determining unit 10 arranged for determining, for individual layers of the layer sequence, predetermined settings of at least one process parameter. The control unit 25 is further arranged for setting of the at least one process parameter according to the predetermined settings. Apparatus 1 may further be arranged for determining, by the determining unit 10, for individual layers of the layer sequence, the predetermined settings of the at least one process parameter before solidifying a first selective layer-part of the powdered material for producing the object 2.

Figure 2:
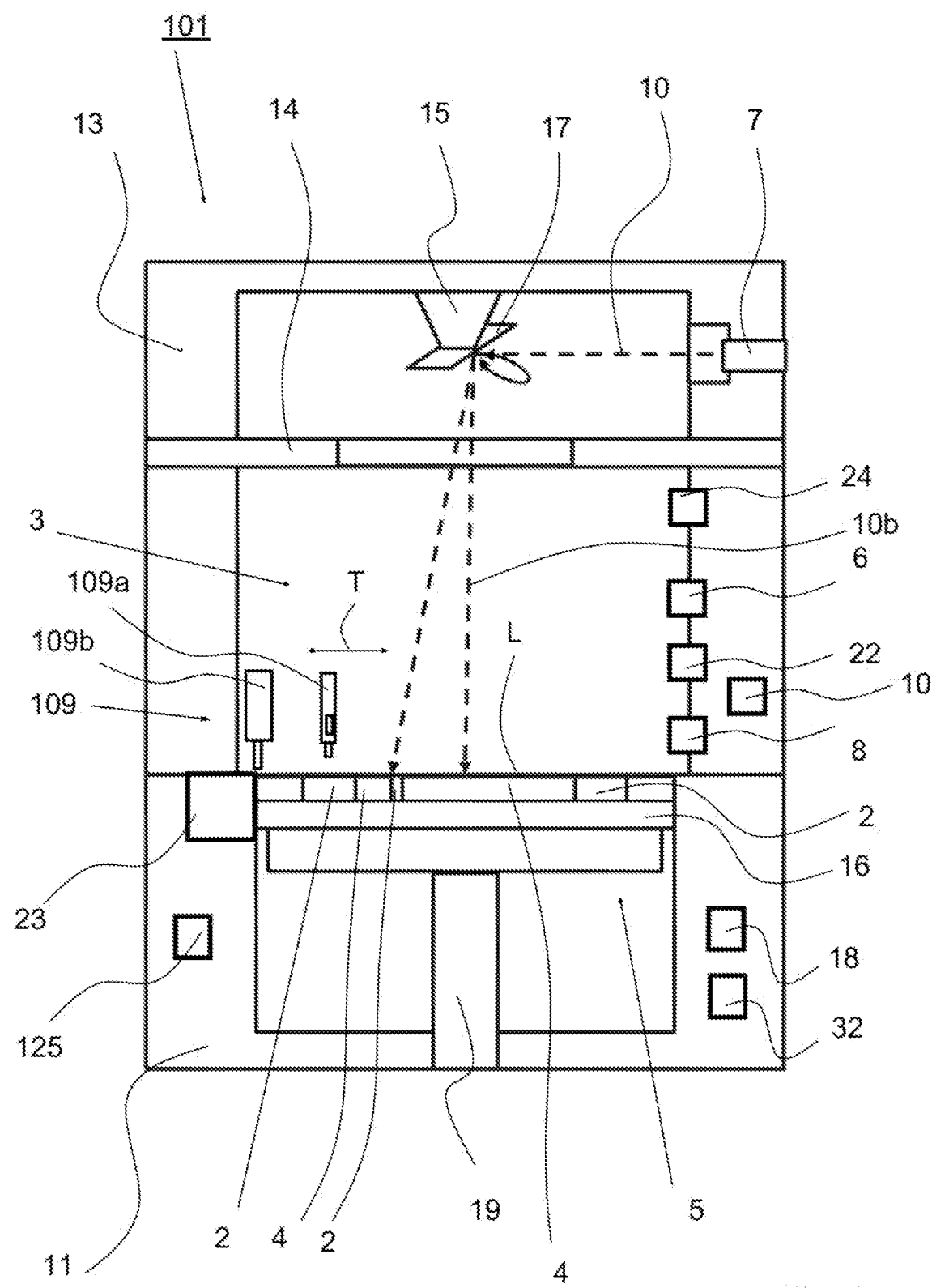
FIG. 2 shows a vertical cross section of a further embodiment of an apparatus according to the second aspect of the present invention.

FIG. 2 shows an apparatus 101, being an alternative embodiment of an apparatus according to the invention. Elements of apparatus 101 that are the same as elements of apparatus 1 are provided with a corresponding reference number, while elements which are different but have the same or a similar function are given a reference number corresponding to that of FIG. 1 raised by 100.

The apparatus 101 has a different embodiment of a recoating device 109. The recoating device 109 has a supply unit 109*a* and has a levelling unit 109*b* which can each independently be displaced along the trajectory T along the surface level of the bath of powdered material 4. In this embodiment, a control unit 125 is configured such that in use a speed of displacement of the levelling unit 109*b* along the surface level of the bath of powdered material is varied during the production of the object, in dependence of a position of the levelling unit 109*b* along the surface level during levelling, and/or a parameter related to a distance between the surface level and the support.

The control unit 125 is also arranged for controlling the displacement of the supply unit 109*a* along the surface level L of the bath of powdered material 4, and is configured such that in use a speed of displacement of the supply unit 109*a* along the surface level of the bath of powdered material is varied during the production of the object, in dependence of a position of the supply unit 9*a* along the surface level during supplying, and/or a parameter related to a distance between the surface level and the support.

Figure 3:
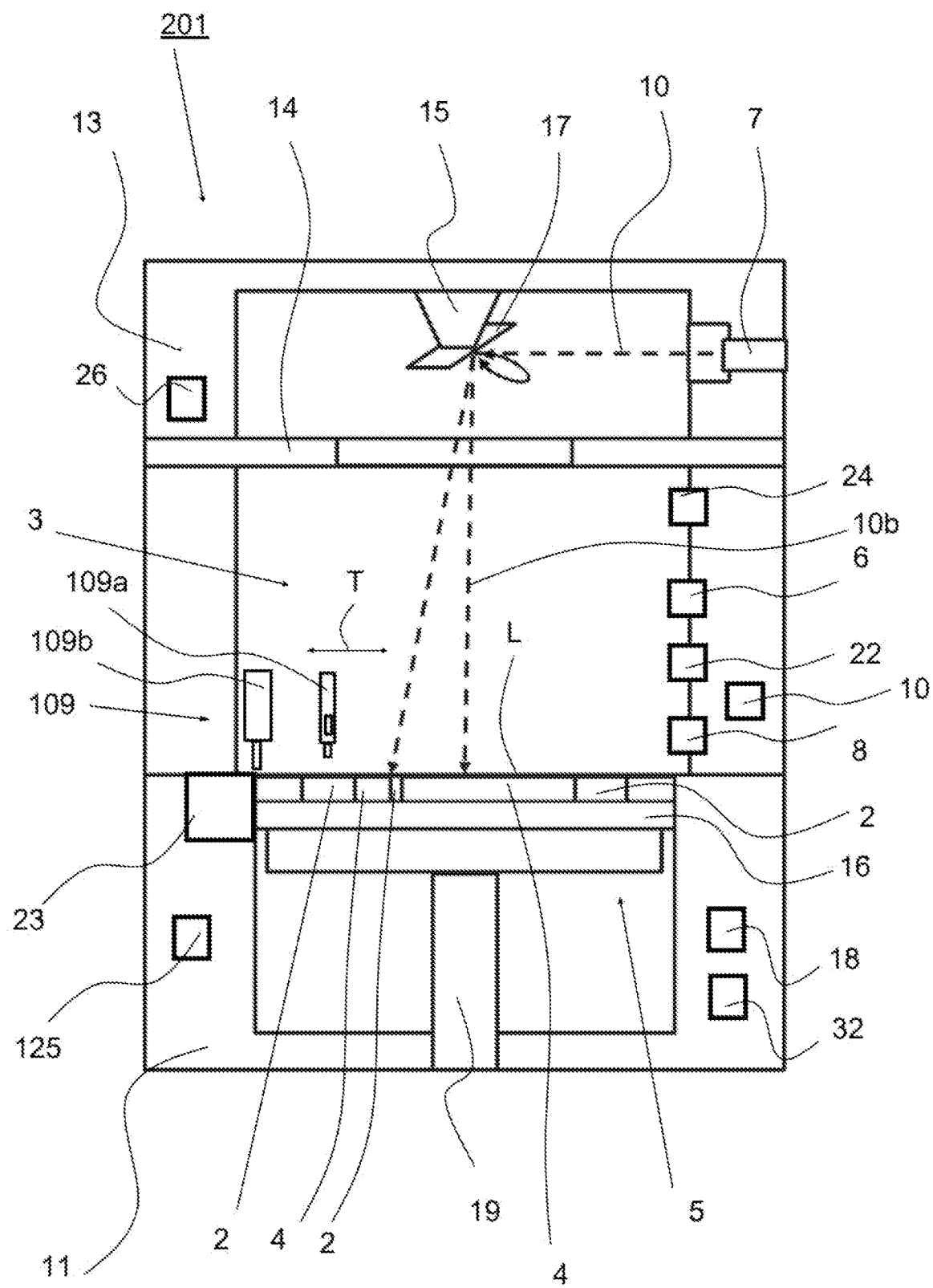
FIG. 3 shows a vertical cross section of another embodiment of an apparatus according to the second aspect of the present invention.

FIG. 3 shows an apparatus 201, being an alternative embodiment of an apparatus according to the invention. Elements of apparatus 201 that are the same as elements of apparatus 1 or 101 are provided with a corresponding reference number, while elements which are different but have the same or a similar function are given a reference number corresponding to that of FIG. 2 raised by 100.

The apparatus 201 is provided with a register 26. The register is communicatively coupled to the control unit 25 and includes historical data. The historical data corresponds to data of the at least one process parameter from a previous object manufactured, preferably an object identical to object 2. The control unit 25 of apparatus 201 is further arranged for retrieving from the register the historical data and adjusting the setting of the at least one process parameter taking into account the historical data. Moreover, the register 26 is arranged for receiving, from the control unit 25, the setting of the at least one process parameter for manufacturing the object 2 and adding, the setting to the historical data.

Figure 4:
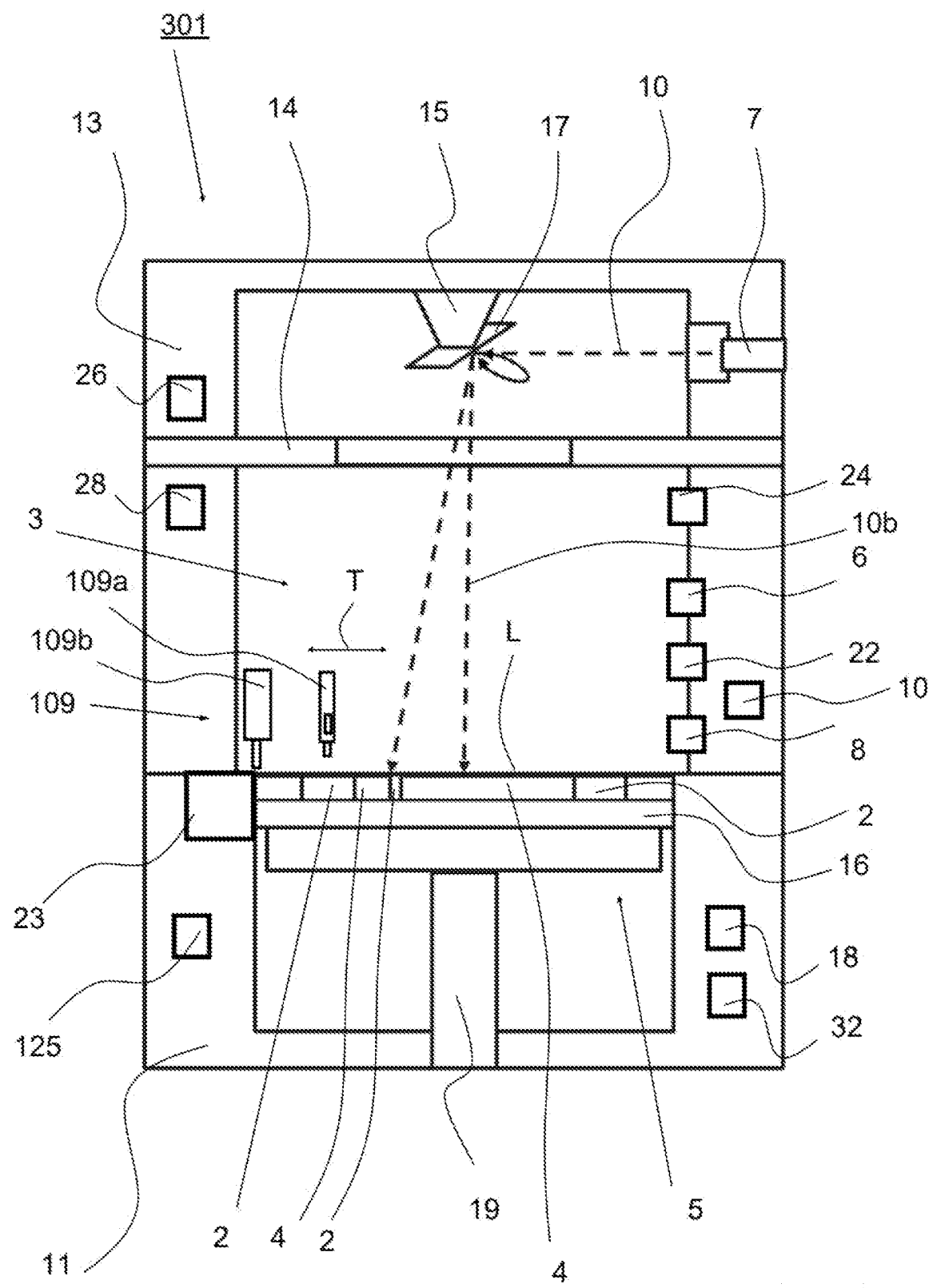
FIG. 4 shows a vertical cross section of a yet further embodiment of an apparatus according to the second aspect of the present invention.

FIG. 4 shows an apparatus 301, being an alternative embodiment of an apparatus according to the invention. Elements of apparatus 301 that are the same as elements of apparatus 1, 101 or 201 are provided with a corresponding reference number, while elements which are different but have the same or a similar function are given a reference number corresponding to that of FIG. 3 raised by 100.

Apparatus 301 is provided with a detection unit 28 that is communicatively coupled to the control unit 25. The detection unit 28 is arranged for detecting, during manufacturing of the object 2, an actual value related to the at least one process parameter. The detection unit 28 may for instance comprise a temperature detector arranged and provided for detecting the temperature of the gas present in the process chamber 3 of apparatus 301, a flow rate detector arranged and provided for detecting the flow rate and/or the flow speed of the gas present in the process chamber 3 of apparatus 301, a humidity detector arranged and provided for detecting the relative humidity of the gas present in the process chamber 3 of apparatus 301, a pressure detector arranged and provided for detecting the pressure in the process chamber 3 of apparatus 301, an oxygen detector arranged and provided for detecting the oxygen level in the process chamber 3 of apparatus 301, a further temperature detector arranged and provided for detecting the temperature of a bath of powdered material provided in the process chamber 3 of apparatus 301, another temperature detector arranged and provided for detecting the temperature of a build plate supporting the layer sequence at a lower side thereof. The control unit 25 is arranged for adjusting the setting of the at least one process parameter taking into account the actual value related to the at least one process parameter detected by the detection unit 28.

The register 26 of apparatus 301 is further arranged for receiving, from the control unit 25, the actual value related to the at least one process parameter and for adding, the actual value related to the at least one process parameter, received from the control unit 25, to the historical data related to the at least one process parameter for manufacturing the object 2.

Figure 5:
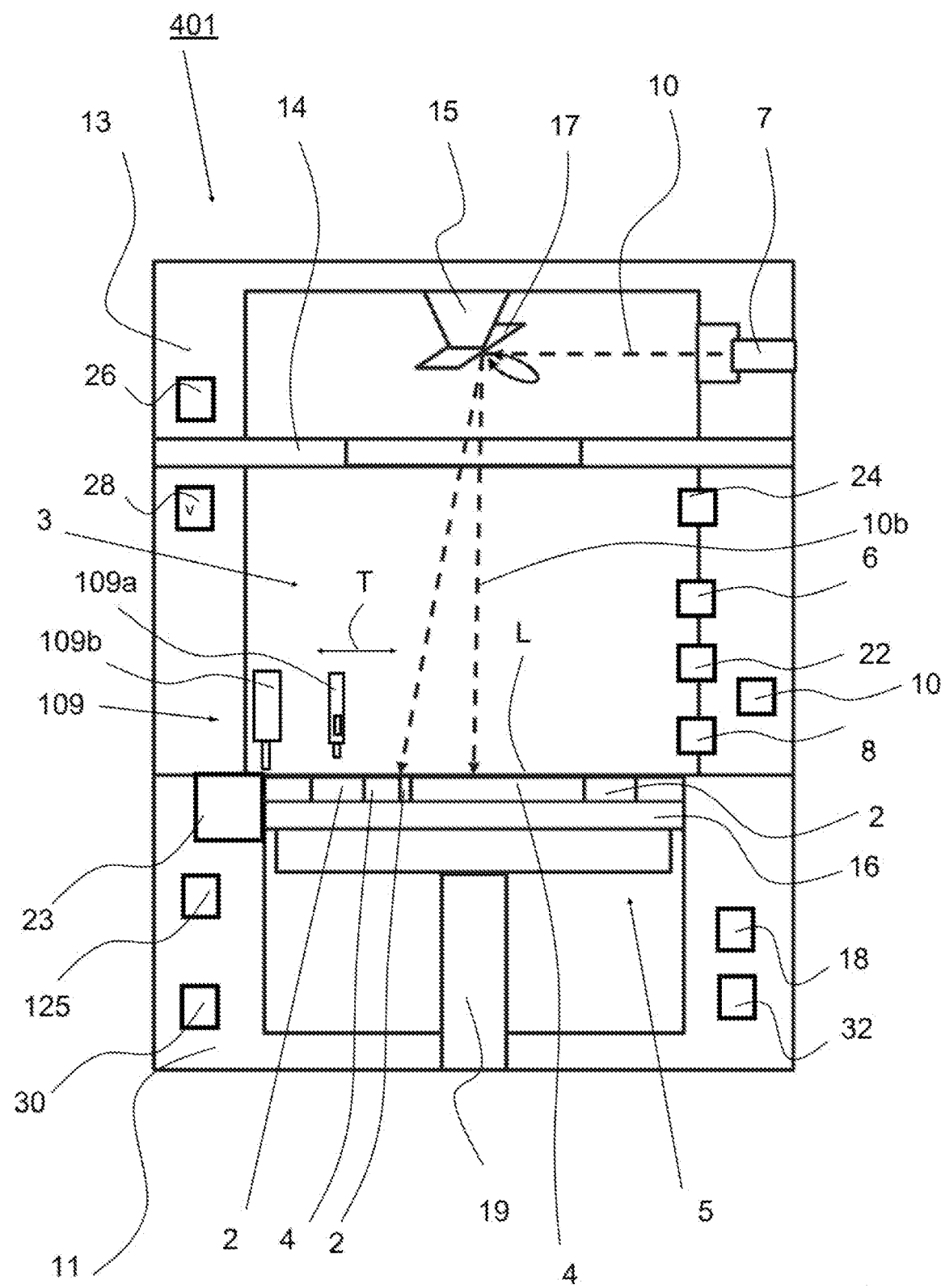
FIG. 5 shows a vertical cross section of a yet another embodiment of an apparatus according to the second aspect of the present invention.

FIG. 5 shows an apparatus 401, being an alternative embodiment of an apparatus according to the invention. Elements of apparatus 401 that are the same as elements of apparatus 1, 101, 201 or 301 are provided with a corresponding reference number, while elements which are different but have the same or a similar function are given a reference number corresponding to that of FIG. 4 raised by 100.

Apparatus 401 includes a processing unit 30 that is communicatively coupled to the control unit 25 of the apparatus 401 and the detection unit 28 of the apparatus 401. The processing unit 30 is arranged for determining an expected future value of the at least one process parameter taking into account the actual value related to the at least one process parameter. The control unit 25 is further arranged for adjusting for individual layers in the layer sequence, the setting of the at least one process parameter during the manufacture of the object 2 taking into account the expected future value of the at least one process parameter.

Figure 6:
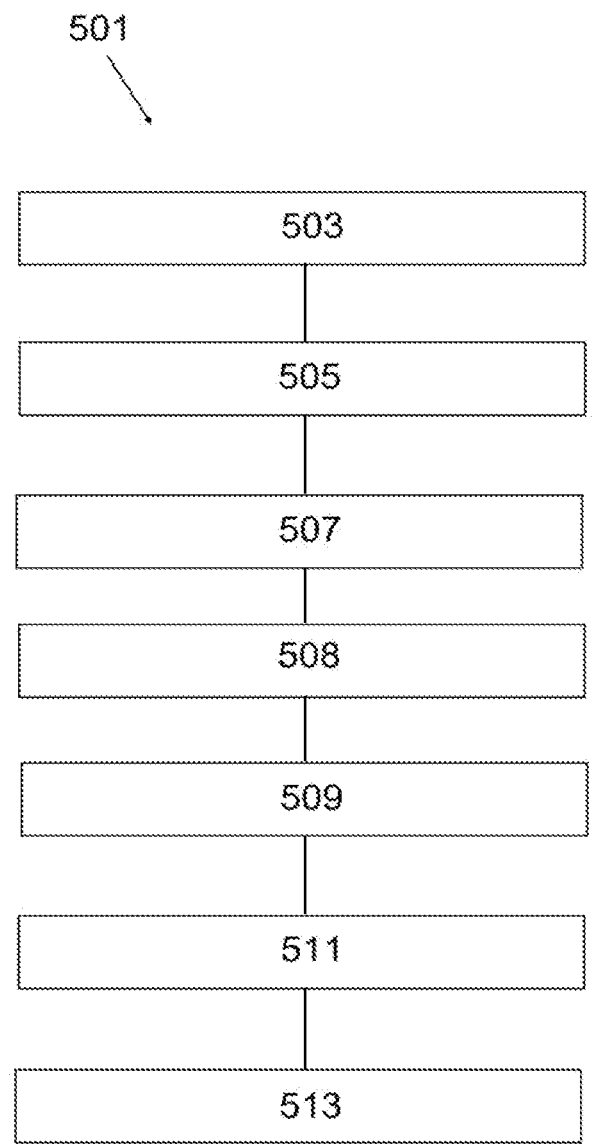
FIG. 6 shows an embodiment of a method according to the first aspect of the present invention.

Referring to FIG. 6, method 501 includes a step of supplying 503, by the supply unit 9*a*, 109*a* of the apparatus 1, 101, 201, 301, 401 a quantity of powdered material to the bath of powdered material 4 that is provided in the process chamber 3. The step of supplying 503 is followed by a step of levelling 505, by the levelling unit 9*b*, 109*b* of the apparatus 1, 101, 201, 301, 401. The levelling unit 9*b*, 109*b* levels, during the step of levelling 505 the surface level L of the bath of powdered material 4 before performing a step of solidifying 507. During the step of solidifying 507, the solidifying device 7 of the apparatus 1, 101, 201, 301, 401 solidifies a selective layer-part of the surface level L of the bath of powdered material 4 for realizing a layer in the layer sequence of the object 2. In order to realize the object 2 the steps of supplying 503, levelling 505 and solidifying 507 are repeated until the object 2 is completed.

Method 501 includes the steps of receiving 509 and outputting 511. During the step of receiving 509, the receiving unit 18 of the apparatus 1, 101, 201, 301, 401 receives an input related to the setting of the at least one process parameter. During the step of outputting 511 the setting of the at least one process parameter is displayed on display 32. Both steps of receiving 509 and outputting 511 may take place during the steps of supplying 503, levelling 505 and solidifying 507 as well as in between the steps of supplying 503, levelling 505 and solidifying 507.

Method 501 further includes the step of adjusting 513. The step of adjusting 513 is performed by the control unit 25 of the apparatus 1, 101, 201, 301, 401. During the step of adjusting 513, at least one of the temperature of gas present in a process chamber 3, the flow rate and the flow speed of the gas present in the process chamber 3, the relative humidity of the gas present in the process chamber 3, the pressure in the process chamber 3, the oxygen level in the process chamber 3, the flow of gas through the process chamber 3, the temperature of the build plate 16 supporting the layer sequence at a lower side thereof, the speed at which the leveling unit 9b is moved along the surface level L for leveling an individual layer in the layer sequence, the number of swipes, by the supply unit 9a, for supplying an individual layer in the layer sequence, a quantity of powdered material used, by the recoating device 9, for providing an individual layer in the layer sequence, a number of successive layers after which the powdered material reservoir 23 of the apparatus 1 needs to be refilled with powdered material, a number of successive layers after which the powdered material reservoir of the supply unit 9a needs to be refilled with powdered material from the powdered material reservoir 23, the extraction rate of extracting the mixture of the gas and waste particles, by the extracting device, from the process chamber 3, the filtering rate of filtering the mixture of the gas and waste particles, by the filtering device, from the process chamber 3 and the alignment accuracy of the solidifying device 7 for solidifying the selective layer-part of the powdered material for manufacturing the object 2 is adjusted.

The step of adjusting 513 may be performed during the steps of supplying 503, levelling 505 and solidifying 507 as well as in between the steps of supplying 503, levelling 505 and solidifying 507.

Method 501 further includes the step of determining 508, by the determining unit 10, for individual layers of the layer sequence, predetermined settings of the at least one process parameter. During the step of adjusting 513, the setting of the at least one process parameter may be adjusted according to the predetermined settings. The step of determining 508, is performed before the step of solidifying 507.

Figure 7:
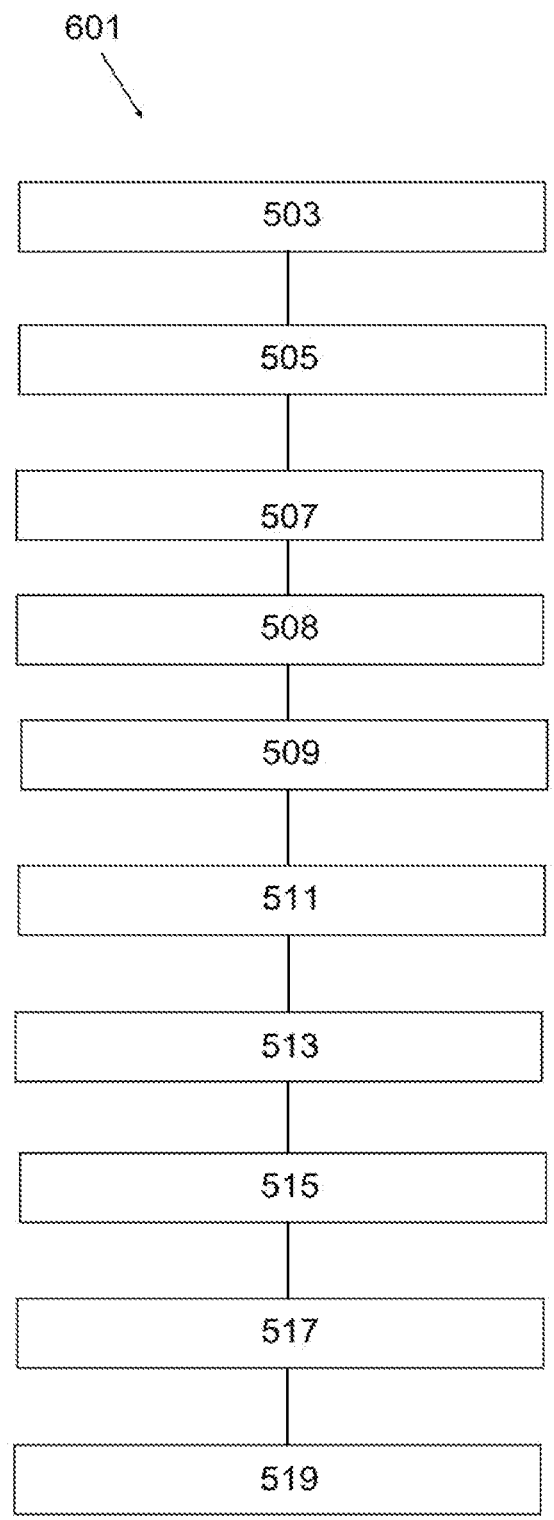
FIG. 7 shows another embodiment of a method according to the first aspect of the present invention.

FIG. 7 shows a method 601, being an alternative embodiment of the method 501 according to the invention. Elements of method 601 that are the same as elements of method 501 are provided with a corresponding reference number.

Method 601 further includes the step of retrieving 515. During the step of retrieving 515 the control unit 25 of the apparatus 201, 301, 401 retrieves from the register 26 historical data related to the setting of the at least one process parameter for manufacturing the object 2. The setting retrieved from the register 26 during the step of retrieving 515 is used during the step of adjusting 513 for adjusting the setting of the at least one process parameter. The step of retrieving 515 may be performed during the steps of supplying 503, levelling 505, solidifying 507, receiving 509, outputting 511 and adjusting 513 as well as in between the steps of supplying 503, levelling 505, solidifying 507, receiving 509, outputting 511 and adjusting 513.

Optionally, method 601 includes the steps of further receiving 517 and adding 519. During the step of further receiving 517, the register 26 of the apparatus 201, 301, 401 receives from the control unit 25 of the apparatus 201, 301, 401, the setting of at least one process parameter for manufacturing the object 2. The setting received by the register 26 during the step of further receiving 517 is added to the historical data provided in the register 26 during the step of adding 519. In an embodiment of method 601 the step of outputting 511 may be omitted.

Figure 8:
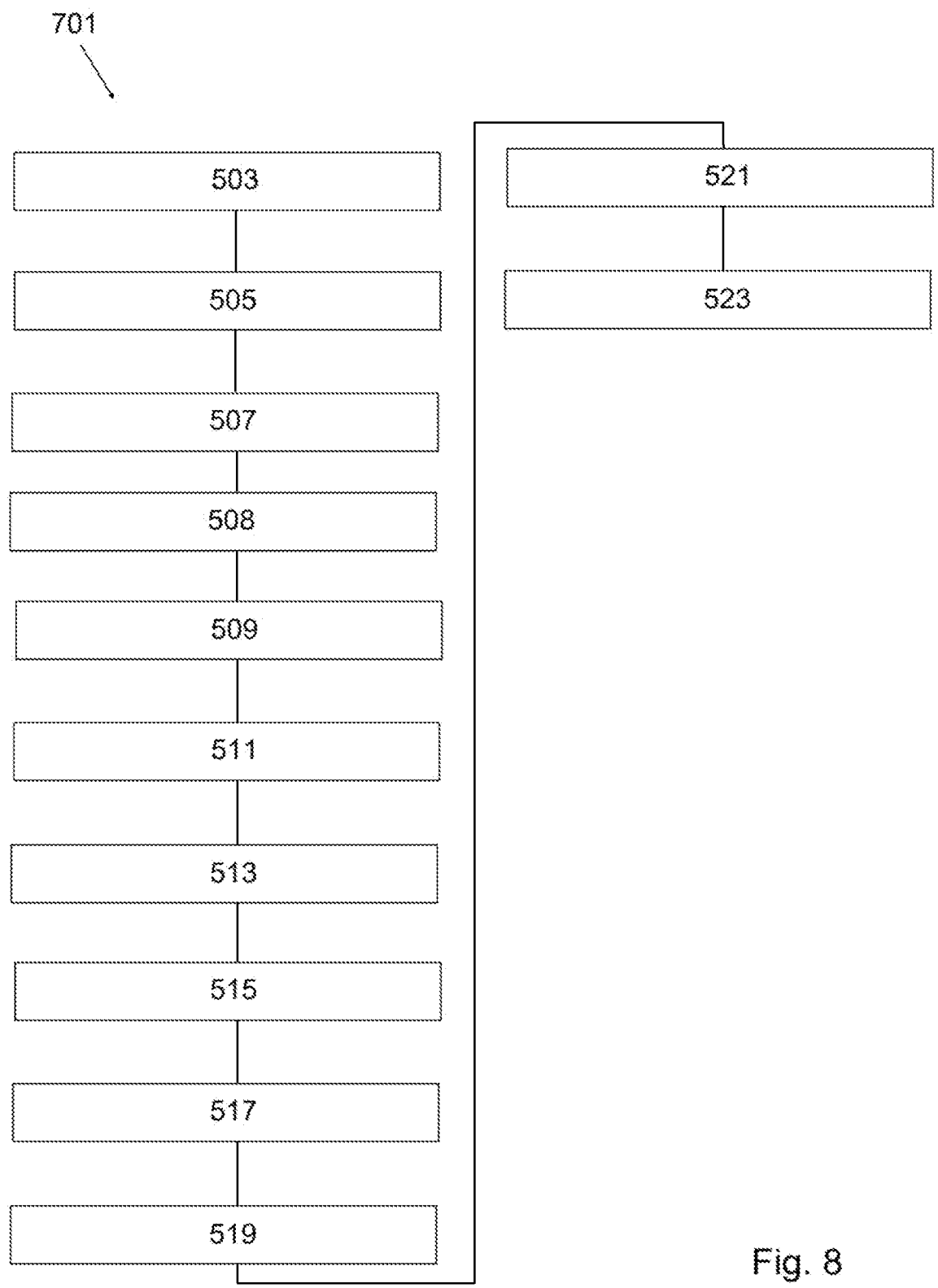
FIG. 8 shows a yet further embodiment of a method according to the first aspect of the present invention.

FIG. 8 shows a method 701, being an alternative embodiment of the methods 501 and 601 according to the invention. Elements of method 701 that are the same as elements of method 501 or 601 are provided with a corresponding reference number.

Method 701 further includes the step of detecting 521. During the step of detecting 521 the detection unit 28 of the apparatus 301, 401 detects an actual value related to the at least one process parameter. As part of method 701, during the step of adjusting 513, the setting of the at least one process parameter is adjusted taking into account the actual value detected, by the detection unit 28, during the step of detecting 521.

Optionally, method 701 includes the steps of yet further receiving 523 and further adding 525. During the step of yet further receiving 523, the register 26 receives from the control unit 25 of the apparatus 301, 401 the actual value related to the at least one process parameter. The actual value received, by the register 26, during the step of yet further receiving 523 is added to the historical data of the object during the step of further adding 525.

Figure 9:
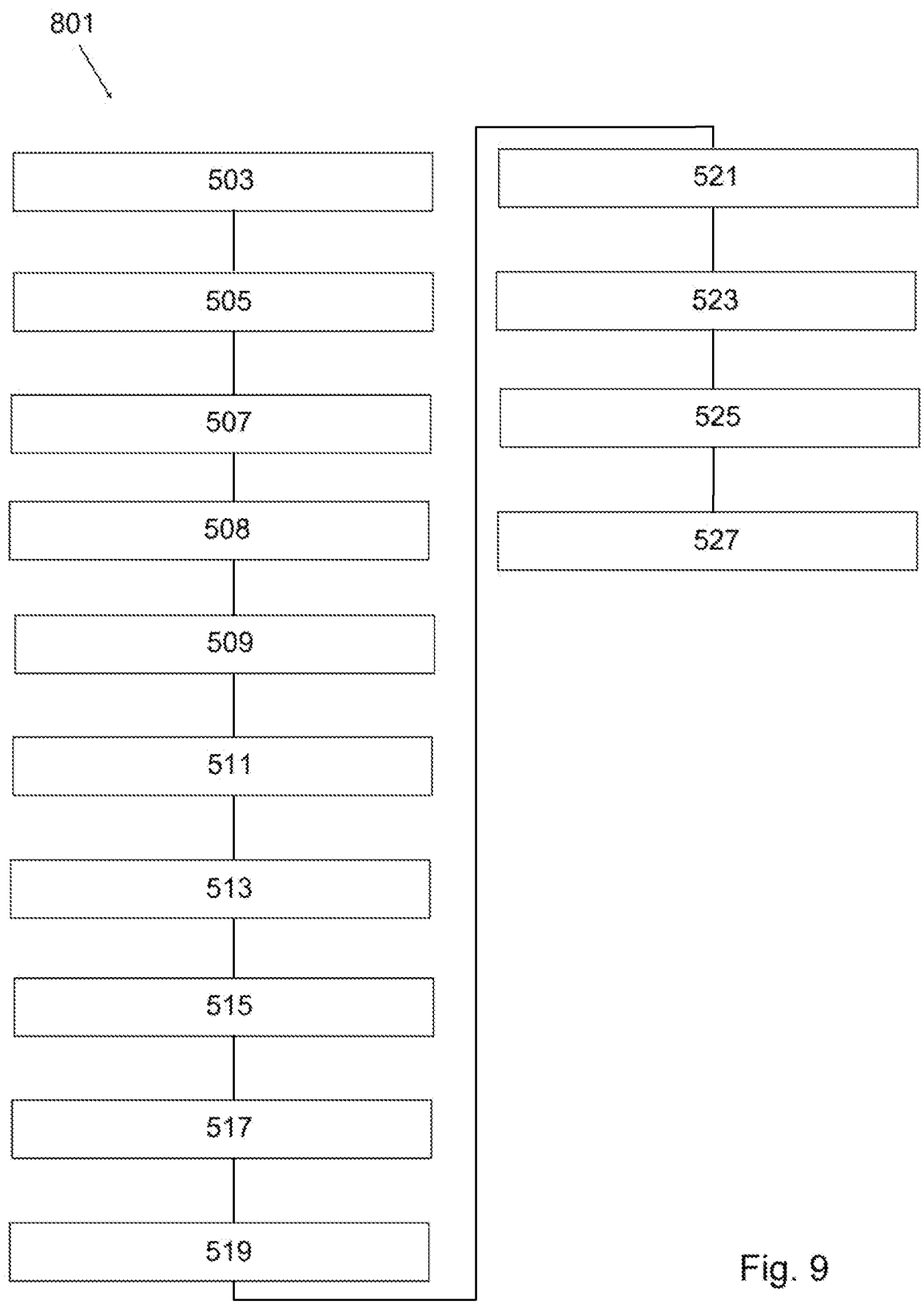
FIG. 9 shows a yet another embodiment of a method according to the first aspect of the present invention.

FIG. 9 shows a method 801, being an alternative embodiment of the methods 501, 601 and 701 according to the invention. Elements of method 801 that are the same as elements of method 501, 601 or 701 are provided with a corresponding reference number.

Method 801 further includes the steps of transmitting 527 and determining 529. During the step of transmitting 527, the control unit 25 of apparatus 401 transmits the actual value related to the at least one process parameter to the processing unit 30. The processing unit 30 determines, during the step of determining 529, an expected future value of the at least one process parameter taking into account the actual value received during the step of transmitting 527.

During the step of adjusting 513 of method 801, the setting of the at least one process parameter is adjusted taking into account the expected future value determined, by the processing unit 30, during the step of determining 529.

In an embodiment of method 801 the step of outputting 511 may be omitted.

What is claimed is:

1. A method for manufacturing an object by additive manufacturing layer by layer in a layer sequence, the method performed by an apparatus, wherein the method comprises the step of:
   adjusting, by a control unit of the apparatus, for individual layers in the layer sequence, a setting of at least one process parameter, during the manufacture of the object, wherein the at least one process parameter is chosen from the group consisting of:
   a temperature of a gas present in a process chamber of the apparatus;
   a flow rate and/or a flow speed of the gas present in the process chamber;
   a relative humidity of the gas present in the process chamber;
   a pressure in the process chamber;
   an oxygen level in the process chamber;
   a flow of the gas through the process chamber;
   a temperature of a bath of powdered material provided in the process chamber;
   a temperature of a build plate supporting the layer sequence at a lower side thereof;

a speed at which a surface level of an individual layer in the layer sequence is leveled;
a number of swipes for supplying an individual layer in the layer sequence;
a quantity of powdered material used for providing an individual layer in the layer sequence;
a number of successive layers after which a powdered material reservoir of the apparatus needs to be refilled with powdered material;
an extraction rate of extracting a mixture of the gas and waste particles from the process chamber;
a filtering rate of filtering the mixture of the gas and waste particles from the process chamber; and
an alignment accuracy of solidifying powdered material at the surface level for manufacturing the object.

2. The method according to claim 1, wherein the step of adjusting the setting of the at least one process parameter is performed for a section of an individual layer of the layer sequence.

3. The method according to claim 1, wherein the step of adjusting the setting of the at least one process parameter is performed for an individual layer of the layer sequence during processing of the individual layer.

4. The method according to claim 1, further comprising the step of:
receiving, by a receiving unit of the apparatus, during manufacturing of the object, an input related to the setting of the at least one process parameter.

5. The method according to claim 1, further comprising the step of:
outputting the setting of the at least one process parameter for at least a part of the layer sequence for display.

6. The method according to claim 1, wherein the method further comprises the steps of:
supplying, by a supply unit of the apparatus, a quantity of powdered material to the bath of powdered material provided in the process chamber;
leveling, by a leveling unit of the apparatus, the surface level of the bath of powdered material; and
solidifying, by a solidifying device of the apparatus, a selective layer-part of the surface level of the bath of powdered material for realizing a layer in the layer sequence of the object.

7. The method according to claim 1, further comprising the step of:
retrieving, by the control unit of the apparatus, from a register of the apparatus or at least related to the apparatus, historical data related to the setting of the at least one process parameter for manufacturing the object;
wherein, during the step of adjusting the setting of the at least one process parameter, the setting of the at least one process parameter is adjusted taking into account the historical data.

8. The method according to claim 1, further comprising the steps of:
further receiving, by the register of the apparatus or at least related to the apparatus, from the control unit of the apparatus, the setting of at least one process parameter for manufacturing the object; and
adding, by the register of the apparatus or at least related to the apparatus, the received setting of the at least one process parameter to the historical data related to the at least one process parameter for manufacturing the object.

9. The method according to claim 8, further comprising the steps of:

yet further receiving, by the register of the apparatus or at least related to the apparatus, from the control unit of the apparatus, the actual value related to the at least one process parameter; and
further adding, by the register of the apparatus or at least related to the apparatus, the received actual value of the at least one process parameter to the historical data related to the at least one process parameter for manufacturing the object.

10. The method according to claim 1, further comprising the step of:
detecting, by a detection unit of the apparatus, during manufacturing of the object, an actual value related to the at least one process parameter;
wherein, during the step of adjusting the setting of the at least one process parameter, the setting of the at least one process parameter is adjusted taking into account the actual value related to the at least one process parameter detected, by the detection unit, during the step of detecting.

11. The method according to claim 9, further comprising the steps of:
transmitting, by the control unit of the apparatus or the detection unit of the apparatus, the actual value related to the at least one process parameter to a processing unit; and
determining, by the processing unit, an expected future value of the at least one process parameter taking into account the actual value related to the at least one process parameter received during the step of transmitting;
wherein, during the step of adjusting the setting of the at least one process parameter, the setting of the at least one process parameter is adjusted taking into account the expected future value of the at least one process parameter determined, by the processing unit, during the step of determining.

12. The method according to claim 1, further comprising the step of:
determining, by a determining unit, for individual layers of the layer sequence, predetermined settings of at least one process parameter.

13. The method according to claim 12, wherein, during the step of adjusting, the setting of the at least one process parameter is adjusted according to the predetermined settings.

14. The method according to claim 12, wherein the step of determining, is performed before the step of solidifying, and wherein during the step of solidifying a first selective layer-part of the powdered material is solidified for producing the object.

15. An apparatus for producing an object by additive manufacturing layer by layer in a layer sequence, the apparatus comprising:
a process chamber for receiving a bath of powdered material configured to be solidified;
a support for positioning the object in relation to a surface level of the bath of powdered material;
a solidifying device for solidifying a selective layer-part of the powdered material; and
a control unit configured for adjusting for individual layers in the layer sequence, a setting of at least one process parameter, during the manufacture of the object, wherein the at least one process parameter is chosen from the group consisting of:
a temperature of a gas present in the process chamber;

a flow rate and/or a flow speed of the gas present in the process chamber;
a relative humidity of the gas present in the process chamber;
a pressure in the process chamber;
an oxygen level in the process chamber;
a flow of a gas through the process chamber;
a temperature of the bath of powdered material;
a temperature of a build plate supporting the layer sequence at a lower side thereof;
a speed at which a surface level of an individual layer in the layer sequence is leveled;
a number of swipes for supplying an individual layer in the layer sequence;
a quantity of powdered material used for providing an individual layer in the layer sequence;
a number of successive layers after which a powdered material reservoir of the apparatus needs to be refilled with powdered material;
an extraction rate of extracting a mixture of the gas and waste particles from the process chamber;
a filtering rate of filtering the mixture of the gas and waste particles from the process chamber; and
an alignment accuracy of the solidifying device for solidifying the selective layer-part of the powdered material for manufacturing the object.

16. The apparatus according to claim 15, wherein the control unit is further configured for adjusting the setting of the at least one process parameter for a section of an individual layer of the layer sequence during manufacturing of the individual layer.

17. The apparatus according to claim 15, wherein the control unit is further arranged for adjusting the setting of the at least one process parameter for an individual layer of the layer sequence during processing of the individual layer.

18. The apparatus according to claim 15, wherein the apparatus comprises a receiving unit arranged for receiving, during manufacturing of the object, preferably from an operator, an input related to the setting of the at least one process parameter.

19. The apparatus according to claim 15, wherein the apparatus is configured for outputting the setting of the at least one process parameter for at least a part of the layer sequence for display.

20. The apparatus according to claim 15, wherein the apparatus comprises a recoating device comprising:
a supply unit comprising the powdered material reservoir for supplying a layer of powdered material to the bath of powdered material; and
a leveling unit configured to be displaced along the surface level of the bath of powdered material for leveling the surface level of the bath of powdered material.

21. The apparatus according to claim 15, wherein the apparatus comprises a register, communicatively coupled to the control unit, comprising historical data related to the setting of the at least one process parameter for manufacturing the object, wherein the control unit is further arranged for retrieving from the register of the apparatus, the historical data related to the setting of the at least one process parameter for manufacturing the object and adjusting the setting of the at least one process parameter taking into account the historical data.

22. The apparatus according to claim 21, wherein the register is configured to receive, from the control unit, the setting of the at least one process parameter for manufacturing the object, and wherein the register is further configured to add, the setting of the at least one process parameter, received from the control unit, to the historical data related to the at least one process parameter for manufacturing the object.

23. The apparatus according to claim 15, further comprising a detection unit, communicatively coupled to the control unit, arranged for detecting, during manufacturing of the object, an actual value related to the at least one process parameter and wherein the control unit is arranged for adjusting the setting of the at least one process parameter taking into account the actual value related to the at least one process parameter detected by the detection unit.

24. The apparatus according to claim 23, wherein the register is further configured to receive, from the control unit, the actual value related to the at least one process parameter, and wherein the register is further configured to add, the actual value related to the at least one process parameter, received from the control unit, to the historical data related to the at least one process parameter for manufacturing the object.

25. The apparatus according to claim 23, wherein the apparatus further comprises:
a processing unit, communicatively coupled to at least the control unit of the apparatus or the detection unit of the apparatus, configured to determine an expected future value of the at least one process parameter taking into account the actual value related to the at least one process parameter;
wherein the control unit is further configured to adjust for individual layers in the layer sequence, the setting of the at least one process parameter during the manufacture of the object taking into account the expected future value of the at least one process parameter.

26. The apparatus according to claim 15, wherein the apparatus comprises a climate regulation unit, communicatively coupled to the control unit, and configured for, taking in to account the setting of the at least one process parameter, regulating at least one of:
the temperature of gas present in the process chamber;
the flow rate and/or the flow speed of gas present in the process chamber;
the relative humidity of gas present in the process chamber;
the pressure inside the process chamber;
the oxygen level in the process chamber;
the flow of gas through the process chamber;
the temperature of the bath of powdered material; and
the temperature of the build plate supporting the layer sequence at a lower side thereof.

27. The apparatus according to claim 15, wherein the apparatus comprises a gas supply unit, communicatively coupled to the control unit, configured to supply the gas to the process chamber and regulate the oxygen level in the gas and/or a flow of the gas through the process chamber taking into account the setting of the at least one process parameter.

28. The apparatus according to claim 15, wherein the apparatus comprises a determining unit configured to determine, for individual layers of the layer sequence, predetermined settings of the least one process parameter.

29. The apparatus according to claim 28, wherein the control unit is configured to set the at least one process parameter according to the predetermined settings.

30. The apparatus according to claim 28, wherein the apparatus is configured to determine, by the determining unit, for individual layers of the layer sequence, the predetermined settings of the at least one process parameter before solidifying a first selective layer-part of the powdered material for producing the object.

\* \* \* \* \*